Aug. 14, 1962 D. C. MEYERS 3,049,292

READ-OUT SYSTEM FOR MULTI-CHANNEL RECORDS

Filed March 16, 1959 3 Sheets-Sheet 1

INVENTOR
DOUGLAS C. MEYERS
BY Oswald H. Milmore
HIS ATTORNEY

Aug. 14, 1962 D. C. MEYERS 3,049,292

READ-OUT SYSTEM FOR MULTI-CHANNEL RECORDS

Filed March 16, 1959 3 Sheets-Sheet 2

INVENTOR
DOUGLAS C. MEYERS
BY Oswald H. Milmore
HIS ATTORNEY

Aug. 14, 1962 D. C. MEYERS 3,049,292

READ-OUT SYSTEM FOR MULTI-CHANNEL RECORDS

Filed March 16, 1959 3 Sheets-Sheet 3

INVENTOR:
DOUGLAS C. MEYERS
BY: Oswald H. Milmore
HIS ATTORNEY

United States Patent Office 3,049,292

Patented Aug. 14, 1962

3,049,292

READ-OUT SYSTEM FOR MULTI-CHANNEL RECORDS

Douglas C. Meyers, Metairie, La., assignor to Shell Oil Company, a corporation of Delaware Filed Mar. 16, 1959, Ser. No. 799,722

6 Claims. (Cl. 235—61.9)

The invention relates to the reading of data in multi-channel records bearing machine-sensitive data marks denoting additive elements of different items of data. More particularly, it is concerned with a system for accumulating the data on appropriate accumulators, so that the data may be analyzed and the relative values determined.

Such multi-channel records may, for example, take the form of punched tapes and may be prepared as described in my copending U.S. application, Serial No. 667,573, now Patent No. 2,987,366, filed June 24, 1957 or in the U.S. application of Milmore, Serial No. 667,881, now Patent No. 2,965,431 filed June 25, 1957. It is, however, also applicable to other media, such as magnetic tape. Such records are useful for recording, in isochronistic relation, different elements of variable data produced by separate data-producing means, such as monotonic data, e.g., the passage of time, the measurement of fluid or electrical current flow, or the counting of objects or events, or fluctuating data, such as those representing temperature and pressure; they may also contain fixed data, such as an identification of the test date, location and conditions, these being advantageously recorded on the same record, either interspersed with or at one end of the variable data marks. Systems using such records may be called incremental pulse data systems or incremental numerical systems.

The type of records for which the read-out system of the invention is particularly useful has the more than one item of data allotted to one or several particular channels; yet all machine-sensitive marks in each allocated channel pertain only to the allotted items. Such utilization of the channels is useful, for example, when the record contains different types of data, e.g., fixed and variable, or two different types of variable data, and the number available channels is less than the items of data. In such case a plurality of items of data are allotted to the same channel, so that some or all of the data channels contain marks pertaining to more than one item of data; the record then contains a separate data-identification channel in which a mark is placed in juxtaposition to the mark in the data channel whenever the latter pertains to one type of data, and no mark occurs in the data-identification column when it pertains to the other type of data. For example, one type of data may be fixed data whereby to distinguish the data of one test from those of a subsequent test which is recorded on the same record. Further, such a record may contain an end-of-test mark in a special column reserved therefor to denote the completion of a series of data marks.

The advantage of incremental pulse data records of the type indicated is that the several items of data can be readily accumulated on counters without the use of decoding circuits, and it is the general object of this invention to provide a system for effecting this.

Specific objects of the invention are: To provide a read-out system which will indicate the relative values of the several items of data at any period during the test.

To effect automatic stopping of the accumulating operation at the end of the test record, so as to distinguish it from data of a subsequent test which is recorded on an adjoining portion of the test record.

To provide a system for printing, e.g., on an electric typewriter, the items of accumulated data as desired or automatically at the end of a test record; ancillary thereto, to provide means for automatically resuming the readout, so that the results of a series of tests can be automatically recorded sequentially in printed form.

Additional objects will become apparent. In summary, the system according to the invention includes a record-reading machine which advances the record and has a bi-stable circuit-control device responsive to the marks in the several allocated channels which are present at the reading station, and a separate accumulator for each such device for counting the numbers of marks in the corresponding channels. For accumulating different types of data, such as fixed test-identification and variable data, identified by marks in a data-identification channel, at least some of the control devices associated with data channels have a plurality of accumultaors and a bi-stable circuit-control device responsive to the data-identification marks is connected to exercise a switching function so that the marks in the data channels will be registered on the proper accumulator. The reading machine is started and stopped by a control circuit which has its energization changed by a bi-stable circuit-control device responsive to marks in an end-of-test record channel. In a more elaborate embodiment of the invention, the last-mentioned device further initiates operation of a scanning unit, which scans the several accumulators and transmits the accumulated information through an appropriate signal channel to any desired receiver, such as an electric typewriter, which prints the accumulated data; this may include manually set (repetitive) data, fixed (test-identification) data and variable test data.

The term "bi-stable circuit-control device" is herein intended to mean not only a mechanical switch or relay having open and closed positions, but various electronic circuits, such as those of the flip-flop type, inclusive of circuits comprising a pair of electron discharge tubes having the control grid and the plate of one tube connected to the plate and the control grid respectively of the other.

The term "accumulator" is herein understood to mean any mechanical, electronic or electromechanical device for counting which is or is capable of actuation in accordance with the operation of an associated bi-stable circuit control device; it may, for example, take the form of a series of ordinately arranged numerical wheels geared to carry from the low order to higher order positions as the units wheel is advanced in steps, or of a stepping switch which is advanced each time its stepping coil is impulsed.

Because these elements are well known per se only one specific type thereof will be illustrated in connection with the accompanying drawing which forms a part of this specification and includes two embodiments by way of illustration, wherein.

*Description of First Embodiment*

Figure 1:
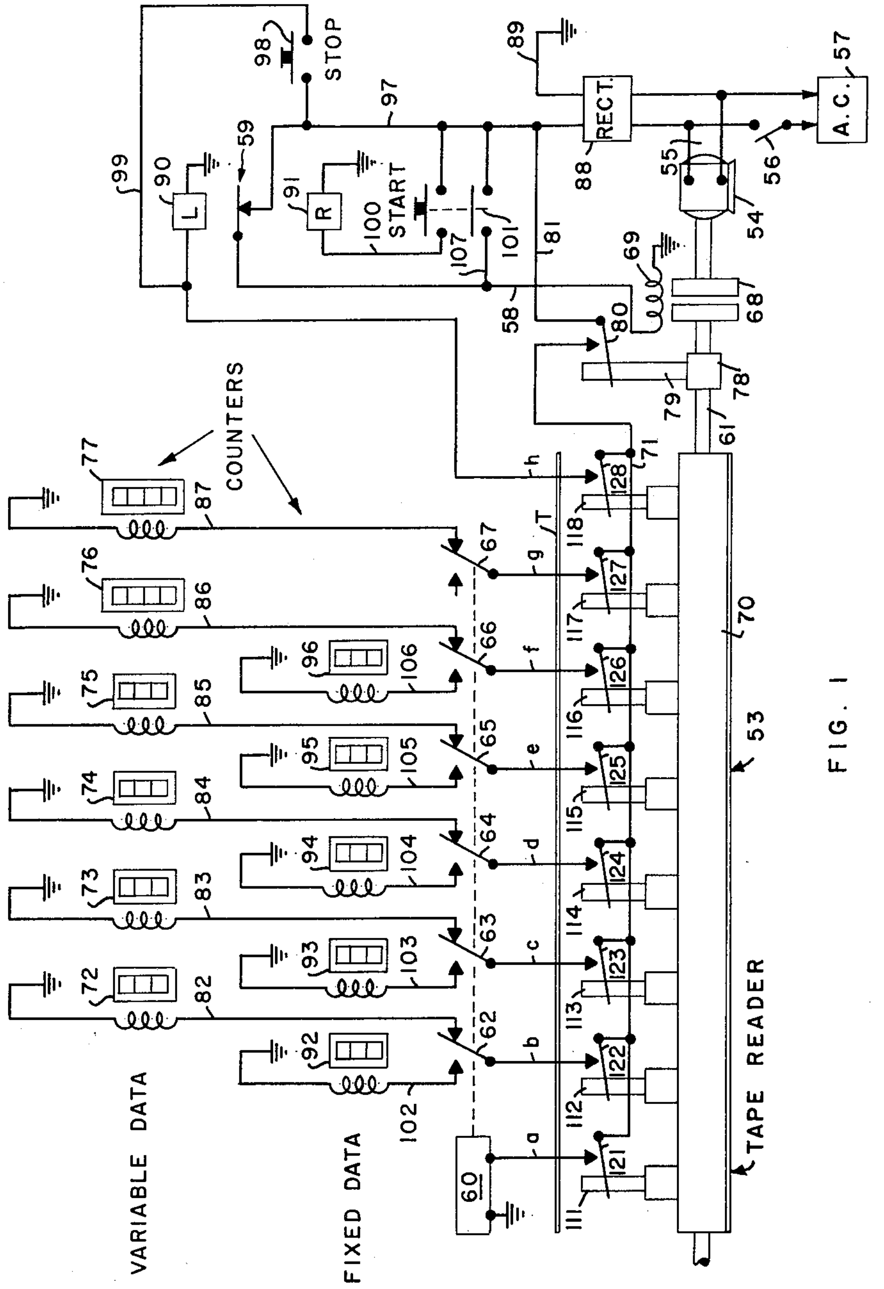
FIGURE 1 is a diagrammatic view of a read-out system and the associated circuit elements, showing a simple embodiment of the invention.

Referring to FIGURE 1, the system includes as major components a record-reading machine, represented schematically by a tape reader 53; a data-discriminating, multi-pole relay having a solenoid 60 and poles 62—67; a first group of accumulators 72—77 connected by separate circuits 82—87 to the normally closed switch contacts of the relay; a second group of accumulators 92—96, connected by separate circuits 102—106 to the normally open switch contacts of the relay; a clutch-control circuit 58 for starting and stopping the reader; and a normally closed latching relay 59 connected in the circuit 58.

The tape reader may be of known construction; being commercially available, no detailed description is required. In the illustrative embodiment it includes a continuously operating electric motor 54, energized by a circuit 55 through a control switch 56 from a source of alternating current 57, an operating shaft 61, and a magnetic clutch 68. The clutch may be of the type which is normally disengaged and couples the motor to the operating shaft when a winding 69 is energized from the control circuit 58. The operating shaft carries an actuating cam 70 which pushes spring-loaded sensing pins 111—118 up once each revolution. These pins have compression springs to permit the top part of each pin to stop short of a complete stroke if it encounters an obstruction in the tape T. The pins are spaced along a line transverse to the tape to enter holes therein in the corresponding channels. It will be understood that the eight-channel tape and the eight-pin machine are merely illustrative of the invention, and that any desired number of channels may be used. The machine is provided with detent means (not shown) for stopping the operating shaft in a predetermined angular position, with all pins retracted, when the clutch is disengaged. The machine further is provided with a tape-advancing mechanism (not shown), driven from the operating shaft, for advancing the tape T lengthwise one step during each time interval that all pins are retracted. Each of the pins actuates a bi-stable circuit control device, such as one of the normally open switches 121—128. One side of each of these switches is connected to a common power circuit 71 and the other sides of the first seven switches are connected by output circuits *a*—*g* to the solenoid 60 and poles 62—67; the output circuit *h* from the eighth switch 128 is connected as described hereinafter. The operating shaft further carries a cam 78 which actuates a cam-follower 79 and a normally open switch 80; the last is connected between the power circuit 71 and a power circuit 81 which leads to a source of direct current potential, such as a rectifier 88 receiving alternating current from the circuit 55. One side of the direct current output is grounded at 89. It will be understood that although, for simplicity, only one side of the direct current circuit is shown and a ground return is used for the other, this is not restrictive of the invention.

Figure 4:
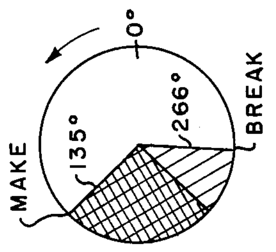
FIGURES 3 and 4 are timing diagrams for the pin-controlled switches and the cam-controlled switch, respectively.
Figure 3:
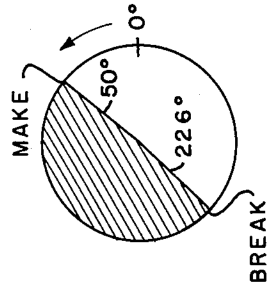

The accumulators 72—77 and 92—96 may be of any type which advance one step each time they are energized, for example, when an electrical pulse passes through the associated solenoid, shown connected between the circuits 82—87, 102—106 and ground. They may have any suitable number of orders or digit positions, e.g., four as shown for the accumulators 76 and 77, or three as shown for the others. When, as with some types of accumulators, it is necessary to limit the duration of the pulse to insure that it will advance only one step on each pulse, the switch 80 is interposed in the power circuit as described above. The operation of switches 121—128 in relation to that of the switch 80 is illustrated in FIGURES 3 and 4, in which the former shows that the switches 121—128 make contact when the operating shaft has turned through an angle of 50° and open at 226°. The switch 80 closes at 135° and opens at 266°. The portions of the cycles at which the switches are closed are shaded. Because these switches are in series the pulses in the circuits *a*—*h* are limited to from 135° to 226°, indicated by the double shading in FIGURE 4.

The latching relay 59 is normally closed (with the type of clutch described) and has two windings, viz., a latching winding 90 for latching it in open position and a release winding 91 to permit closure. When either of these is momentarily actuated the relay operates and remains in latched or released position until the other is actuated. The control circuit is completed from the switch 59 by a circuit 97 to the source of direct current potential. The latching solenoid 90 has one side grounded and the other terminal is connected to the output circuit *h*, whereby the relay will be latched open whenever a punch occurs in the record channel on which the pin 118 operates. It may also be latched open by a manually-operated, normally open, spring-loaded push-button switch 98 which is connected by a circuit 99 between the circuits *h* and 97. The release solenoid 91 has one side grounded and the other connected by a circuit 100 to the circuit 97 through one section or pole of a two-pole, normally open, spring-loaded push button switch 101. The other section or pole of this switch is connected by a circuit 107 between the circuits 58 and 97. It is evident that depression of this push button will immediately apply power to the circuit 58 to operate the clutch and start operation of the reader; it will also energize the release solenoid 91 to close the switch 59 and continue the application of power after the push button is released.

Figure 2:
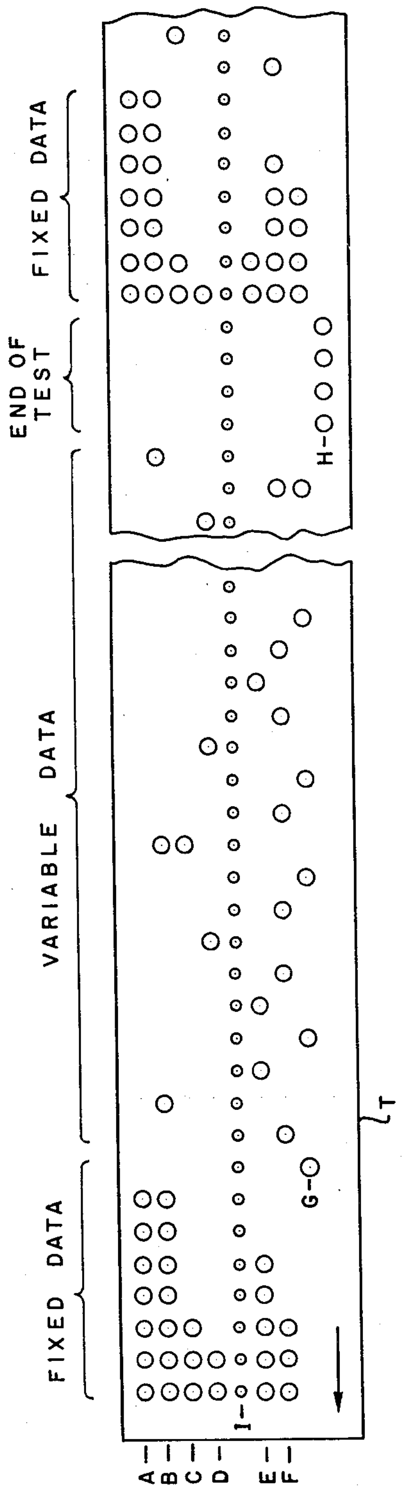
FIGURE 2 is a plan view of a portion of a punched tape which can be used as the record.

Referring to FIGURE 2, the punched record tape T has a central row of equally spaced sprocket holes I to insure proper advancement of the tape and eight record channels A—H, which are situated to be sensed or read by the pins 111—118, respectively. The channel A is a data-identification channel and a punch is placed in this column each time that fixed data are punched concurrently in the other channels. Channels B—F are allocated to five items of fixed data, such as the lease number, the well number, producing formation, the choke size and the day of the month. The tape being advanced in the direction indicated by the arrow, it is seen that these fixed data appear at the start of the record, and are read, respectively as 7, 3, 2, 5, 3. The punches in channel A further serve as start-of-test marks.

The channel G is allocated and the channels B—F are further allocated to six items of variable data, identified by the absence of a punch in channel A. For example, these six items may be the quantities of oil, water, first type of gas, second type of gas, pressure and time, respectively. The time marks in channel G are emitted at equal time intervals, e.g., every 36 seconds, so that by counting the marks in this channel it is possible to determine the elapsed time to any point in the test. The pressure marks may denote an integrated pressure, i.e., they are produced at the source at a rate proportional to the pressure. It will be noted that when, as in the record shown, the tape is produced by punching each time that a punching machine receives a data signal denoting an additive quantity, only one hole is in most instances punched at one time; however, occasionally several punches may be made simultaneously, as shown for the first variable data punch in channel C and the last one in channel G.

The channel H is used only to contain punches which denote the end of the test. To insure response it is preferred to include a plurality of such punches, as shown. Following these end-of-test punches a subsequent test appears on the tape, as indicated by a new set of fixed data.

*Operation of First Embodiment*

The tape being in position and the switch 56 closed, accumulators 72—77 and 92—96 are reset to zero and the push-button 101 is depressed to apply power to the circuits 58 and 100. This engages the clutch 68 and starts operation of the operating shaft 61 to cause the machine to read the tape. The tape is often most conveniently positioned initially with a series of end-of-test holes in channel H at the reading station. Each of these holes causes the switch 128 to energize the circuit *h*, tending to latch the relay. This would stop the machine were the lower pole of the switch 101 not provided. The series of holes in channel H passes the reading station in a fraction of a second, so that by the time the push-button is released no further closing of the switch 128 occurs and the relay remains released.

While the fixed data are read the circuit *a* is energized for each hole in channel A; this energizes the relay solenoid 60, operates the relay poles 62—67, so that electrical pulses equal in number to the number of holes in the channels B—F are transmitted through the normally open contacts and circuits 102—106 to the accumulators 92—96, respectively. The reading of variable data holes follows without interruption; in this case, however, the circuit *a* is not energized and the electrical pulses, equal to number of holes in the channels B—G are transmitted through the normally closed contacts of the poles 62—67 and the circuits 82—87 to the accumulators 72—77.

When the end-of-test holes in channel H reach the reading station the circuit *h* and solenoid 90 are energized; this operates and latches the relay to open the switch 59 and stop the machine. The counters on the accumulators can then be read and reset. Then the push-button 106 is again depressed to read the next test.

When it is desired to compare the data values accumulated up to a selected point in the record, e.g., to compare the well flow rates during successive one-hour periods, the push-button 98 is depressed. This latches the relay 59 to stop the machine. The machine is re-started without resetting the accumulators by means of the switch 101.

*Description of Second Embodiment*

Figure 5:
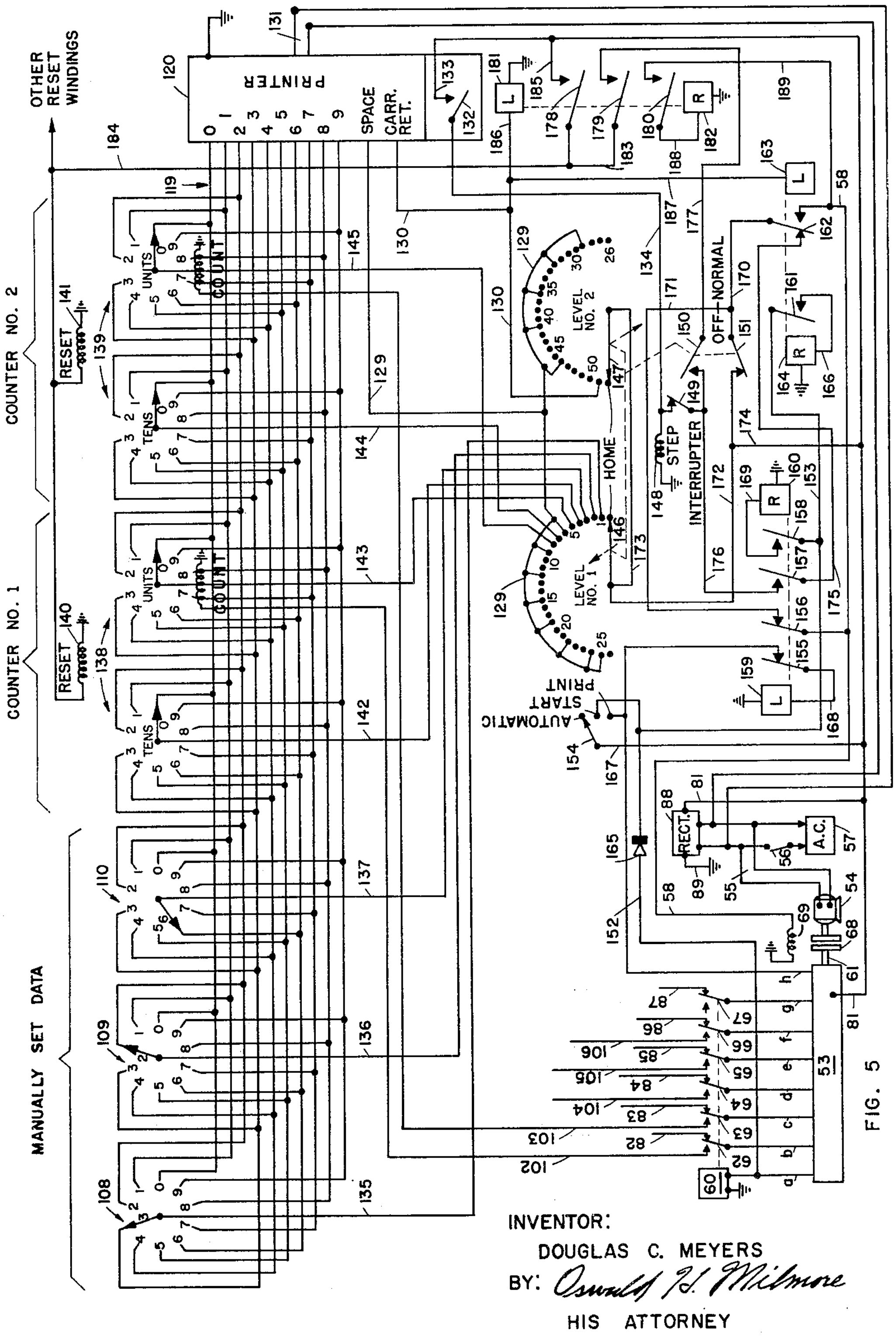
FIGURE 5 is a diagrammatic view of a modified embodiment of the read-out system whereby fully automatic operation and printing of the accumulated data are effected.

FIGURE 5 shows an embodiment employing the features of FIGURE 1 but adding automatic stop and start control means and an automatic print-out device. In this view reference numbers *a—h,* 53—58, 60—69, 81—89 and 102—106 denote parts identical to those previously described, it being understood that the machine 53 includes the parts 70, 71, 78—80, 111—118 and 121—128. 108, 109 and 110 denote manually settable, ten-position rotary switches, having stationary contacts numbered 0–9 which are connected to correspondingly numbered wires of a twelve-conductor cable 119. This cable forms a circuit channel and is connected to a printing machine 120 of any suitable type which will print the corresponding number whenever any one of the ten numbered wires is energized. The printer may, for example, be an electric typewriter including, a drive motor and suitable mechanism for operating the printing keys. The other two wires of the cable, identified by reference numbers 129 and 130, activate the space bar and the carriage return, respectively. The machine drive motor is energized by a circuit 131 connected to the circuit 55. The machine further includes a feed-back switch 132 which closes each time a printing operation is performed, and opens at or near the end of the printing cycle so as to control the transmission of the next pulse through the cable 119 in the manner to be described. This switch is connected to the source of direct current potential via the circuits 133 and 81, and the feed-back pulses are applied to an output circuit 134. Each of the rotary switches 108—110 has a movable contact arm which is connected to a separate circuit 135, 136 or 137, respectively, which are sequentially energized by a stepping switch, to be described.

Each of the circuits 82—87 and 102—106 is connected to the operating or "count" solenoid of a separate accumulator, as shown in FIGURE 1. However, in this embodiment the accumulators have switches by which their accumulated values can be transmitted to the signal channel or cable 119. Only two of these accumulators are shown in FIGURE 5 at 138 and 139, connected to respond to signals in the circuits 102 and 103, respectively. These may have any desired number of digit or numerical wheels; for simplicity, only two, for the units and tens positions, respectively, are shown. It will be understood that the "count" solenoid of each accumulator advances the units wheel one of its ten steps for each pulse and that the tens wheel is advanced one step each time the units wheel advances from the "9" to the "0" position. Each accumulator has a reset solenoid 140 or 141 which, when energized, resets all wheels of its accumulator to zero, as shown. Each digit wheel includes a rotatable contact arm making electrical contact sequentially with the ten fixed contacts, as shown, and these contacts are individually connected to the correspondingly numbered wires of the cable 119. The movable contact arms are connected to circuits 142, 143, 144 and 145, respectively.

Although one specific type of accumulator was shown, it is evident that this is not restrictive of the invention; thus other forms of accumulators, such as stepping switches, may be used.

Scanning of the switches 108—110 and the several accumulators 138, 139, etc., is effected by a stepping switch having, as a minimum, two more positions than the total printing positions (including spaces) to be printed on each line of text by the machine 120. In the embodiment to be described, each line includes 50 printing positions and a 52-position switch is required. This may be achieved by using a commercially available switch having two banks or levels, each with 26 contacts occupying 180°, with wiper arms oriented 180° apart. Such a switch is indicated diagrammatically in the drawing, wherein 146 and 147 are the coupled wiper arms; level No. 1 contains 27 contacts, identified as "home" and 26 numbered contacts, and level No. 2 contains 27 contacts numbered 26–51 and a final "home" position, all numbered counter-clockwise. These wipers are moved in unison in the counterclockwise direction by a stepping solenoid 148 connected to the circuit 134.

The stepping switch further has an interrupter switch 149 which opens when the stepping solenoid is energized; and an "off-normal" switch, including two sections 150 and 151, which are respectively open and closed, as shown, when the wiper arms are in the home positions, but are respectively closed and open in all other positions of the arms.

In the type herein contemplated an indirect spring drive is used, i.e., the wipers advance during release of the armature. Thus, when the solenoid 148 is energized, it attracts the armature and the driving pawl is withdrawn from the tooth of a ratchet wheel and into engagement with the next ratchet tooth. This movement acts upon a coiled driving spring which also opens the interrupter switch 149. De-magnetization of the solenoid allows the driving spring to exert a force through the driving pawl on the ratchet tooth to advance the wipers one step; this also closes the interrupter switch 149. It is evident that the invention is not restricted to this type of construction, but may be used also with directly driven wipers, which advance when the solenoid is energized; in this event the switch 132 would be of the type which is normally closed and which opens during the printing cycle.

The space-control circuit 129 is connected to the contacts of the stepping switch corresponding to positions on the line of text where spaces are to occur, e.g., contacts 6, 9, 12, 15, 18, 21, 24, 25, 29, 33 37 41 and 46. The carriage-return circuit 130 is connected to the contact next beyond the last printing position e.g., 51, as shown. The home position contacts are unwired. The circuits 135—137 are connected respectively to the first three contacts, and the circuits 142 and 143 respectively to the fourth and fifth contacts of the stepping switch, for printing a five-digit number without internal spacing. The circuits 144 and 145 are wired to the seventh and eighth contacts, respectively to print a two-digit number. It will be understood that the other contacts before No. 51 for which no connections are shown in the drawing are similarly wired to other counters or rotary switches. It may be noted that two adjacent spaces are provided in the 24- and 25-positions, denoting the change from fixed to variable data; and that the number of printing positions between spaces is not uniform, being selected in accordance with the number of digits in each total to be printed, determined by the number of digit wheels for the different accumulators and, where used, the number of manually set rotary switches.

The reader-output circuit *a* is connected to a branch circuit 152 having three connections, respectively, with the center or "Start" contact of a three-position, manually settable function switch 154; with the normally open pole 158 of a first four-pole latching relay which comprises poles 155—158, a latching winding 159 and a release winding 160; and via a circuit 153 with the normally open pole 161 of a second, two-pole latching relay which comprises poles 161 and 162, a latching winding 163, and a release winding 164. The make-contact of pole 161 is connected via circuit 166 to the release winding 164. The movable contact arm of the function switch 154 is connected by a circuit 167 to the power circuit 81. The function switch is optional; when used, it is advantageous to place a diode 165 in the circuit 152 between this switch and relay solenoid 69 to prevent direct current applied by the function switch from energizing the said solenoid. The uppermost or "Automatic" contact of this switch is unconnected and the lowermost or "Print" contact is connected to the reader output circuit *h*, which is further connected to the normally closed back-contact of the first relay pole 155; the latter is connected by a circuit 168 to the latching winding 159. The release winding 160 is connected by a circuit 169 to the make-contact cooperating with the pole 158.

The clutch-control circuit 58 to the clutch solenoid 69 is connected to the normally closed pole 156 of the first latching relay and to the make-contact which cooperates with the pole 162 of the second latching relay. The latter pole is connected by a circuit 170 to one side of the normally closed, off-normal switch 151 and further, by a circuit 171, to the back contact of the pole 156. The other side of switch 151 connected by circuits 172 and 173 to the two wiper arms 146 and 147 of the stepping switch. The last-mentioned circuits and wiper arms are connected to the power circuit 81 via a connecting circuit 174, whereby the clutch-control circuit 58 is energized through the off-normal switch 151 whenever the steppnig switch in home position and either the first latching relay is released (via circuit 171 and pole 156) or the second relay is latched (via circuit 170 and pole 162), or when both the latter requirements are met. The wiper arms 146 and 147 are energized under the same conditions, although it is evident that the circuit 172 may be further controlled by an auxiliary interrupter switch which opens while the arms are in motion, so as to prevent arcing at the contacts of the stepping switch. This expedient being well known to electrical engineers and devoid of patentable significance, it is not shown in the drawing.

The back-contact cooperating with pole 162 is connected via a circuit 175 to the pole 157 of the first latching relay, which has the normally open contact thereof connected via circuit 176 to one side of the interrupter switch 149 and further to one side of the normally open, off-normal switch 150; the other side of the interrupter is connected to the circuit 134 and that of the switch 150 is wired through a circuit 177 to the normally open make-contact which cooperates with pole 179 of a third, three-pole latching relay. This relay further includes poles 178 and 180, a lathing winding 181, and a release winding 182. The pole 179 is connected via a circuit 183 to the pole 178 and, by a circuit 184, to the reset solenoids 140 and 141 as well as to the reset windings of other accumulators (not shown). The make contact of the pole 178 is connected by circuit 185 to the power circuit 81. The carriage-return circuit 130 is connected by branch circuits 186 and 187 to the latching windings 181 and 163, respectively. The pole 180 is connected via circuit 188 to the release winding 182 and its normally open contact is connected via circuit 189 to the circuit 58. The circuits 183 and 184 are thereby energized (via circuits 81 and 185 and pole 178) whenever the third relay is latched, to reset the accumulators; this energization is further effective, when the wiper arms of the stepping relay are away from home position, to apply power via pole 179, circuit 177 and switch 150, to the interrupter switch 149 and stepping solenoid 148 to step the wipers to home position.

*Operation of Second Embodiment*

The second embodiment is also used with punched tape such as is shown in FIGURE 2. The manually settable rotary switches, such as switches 108—110, are set to data which is to be printed repetitively for a number of tests, e.g. to correspond to the first digits "3," "2" and "6" of a lease number which identify the general area, etc. For automatic operation all other relays and switches are initially in the normal positions as shown (released or home). Should they be initially in other positions, they can be returned to normal by operating the function switch 154 with the power switch 56 on. Thus, momentary movement to the "Start" position energizes circuits 152 and 153 to release the first and second latching relays 155—160 and 161—164; the third latching relay 178—182 is automatically released from circuits 58 and 189 when power is applied to the clutch magnet. Should the stepping switch be away from the home position the function switch is momentarily moved to the "Print" position to energize the circuit *h*, thereby releasing the first latching relay and initiating printing and stepping of the switch to home position in the manner described in detail hereinafter.

The tape is placed into the machine with the switch 56 open and the first row of holes at the reading position or in advance thereof. When the switch 56 is closed power is applied to the motor 54 and circuit 81 and, from the latter, to the clutch magnet circuit 58 via the circuit 174, the closed off-normal switch 151, circuit 171 and pole 156. The tape is advanced in steps and read as was described for the first embodiment, to cause the counters or accumulators to register the electrical pulses transmitted via the circuits 82—87 and 102—106.

When the end-of-test punches of record channel H reach the reading station of the machine 53 the output channel *h* and latching winding 159 are energized to operate the first latching relay 155—160. This interrupts power to the clutch-control circuit 58 via the pole 156, thereby stopping the reading machine. It is desirable to provide on the record a series of end-of-test punches, as shown in channel H, to guard against the possibility of continued operation of the reading machine for one or more cycles after the first such punch is read, it being noted that de-energization of the clutch winding 69 occurs only after the first latching relay has been operated; this may with some machines occur during the reading cycle following that which first caused the circuit *h* to become energized. Latching of the first relay also applies power to the stepping solenoid 148 from power circuit 81 via circuit 174, the closed, off-normal switch 151, circuit 170, pole 162, circuit 175, pole 157, circuit 176 and the interrupter switch 149 to advance the driving pawl; this circuit is opened upon the temporary opening of the last-mentioned switch by the energization of the solenoid 148 to cause the driving pawl to retract and advance the wipers 146 and 147 one step from home position. Movement of wiper 146 applies power to the first contact of the stepping switch via circuits 172 and 174. When the wipers leave home position the two off-normal switches operate, whereby the circuit 170 is de-energized to prevent a second step to be induced via circuit 176 when the interrupter switch 149 again closes. The circuit 177 is likewise not energized because the third latching relay is still released. The stepping switch must, therefore, await application of power to the circuit 134 before taking another step.

When the first step of the wiper arms is completed power flows from the wiper 146 via circuit 135 to the first rotary switch 108 and thence through one of its ten contacts to energize the corresponding one of the ten numbered wires of the cable 119. Stated otherwise, a signal is thereby transmitted through the signal channel 119 from the first switch to the printing machine 120, which is assumed to be in condition to print the first character at the left end of a line. Thus, assuming the switch 108 to have been set at "3," the third wire of cable 119 is energized and a "3" is printed. When printing occurs the feed-back switch 132 is closed momentarily and reopened, thereby applying a pulse of power from circuit 133 to the circuit 134; this energizes the winding 148 momentarily to advance the driving pawl. Upon cessation of the pulse the pawl retracts to step the switch to its second position. Power now flows from the wiper 146 via the circuit 136 to the second rotary switch 109 to cause the printing machine to print a second character. These operations are repeated for all switches, including the accumulator switches 138 and 139.

When the wiper 146 reaches the sixth position it applies power via wire 129 of the cable 119 to space the printing machine one step; this likewise causes the feed-back switch 132 to operate, to advance the wiper to the seventh position, apply power to the circuit 144, and cause the next character to be printed. These operations are repeated until all of the rotary switches and accumulators (including those not shown) have been scanned, it being understood that the second level, which includes wiper 147, is active instead of the first level starting with the 26th step.

Figure 6:
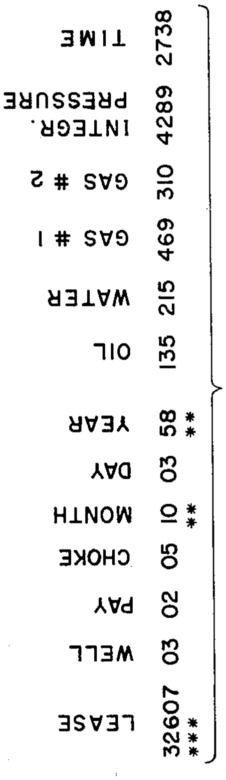
FIGURE 6 shows one line of printing produced by the system of FIGURE 5.

One line of the printed record prepared by the printer 120 is shown in FIGURE 6, wherein the meanings of the data are indicated at the top and the characters are printed as they would appear for the tape shown in FIGURE 2 and the stepping switch settings shown in FIGURE 5. The numbers indicated by asterisks are manually set, by means of the rotary switches such as 108—110, and could remain alike for a series of tests.

After the last character is printed the wiper 147 advances to the 51st (or some other pre-selected) contact, thereby energizing the carriage-return wire 130 of the cable 119, and causing the printing machine to advance the record one printing line and to return the carriage; this also energizes the latching windings 163 and 181 via circuits 187 and 186, respectively, to latch the second and third relays. This in turn applies power via circuit 185 and pole 178 to the circuit 184 to reset the accumulators by energization of their solenoids, such as 140 and 141; it further applies power through circuit 183, the pole 179 and circuit 177 to the now closed off-normal switch 150 and the interrupter switch 149 to the stepping solenoid 148 to step the stepping switch to home position.

When the stepping switch reaches home position the off-normal switches operate to open switch 150 and stop further energization of the stepping solenoid 148. The wipers therefore stop in their home positions. The simultaneous closing of the switch 151 applies power via circuits 174 and 170 and pole 162 to the clutch-control circuit 58 to start the reading machine; this also energizes the circuits 189 and 188 to release the third relay. Any end-of-test holes in channel H which have not yet passed the reading station would cause the circuit *h* to be energized; this is, however, ineffective to stop the machine because the second relay is still latched. The parts 151, 170 and 162 therefore constitute an auxiliary control means for restarting the machine despite the latched condition of the first relay.

When the first fixed data identification punches in record chanel A are sensed the output circuit *a* is energized with the following effects (in addition to the operation of the relay 60, 62—67): Firstly, the release winding 160 is energized via circuit 152, diode 165, pole 158 and circuit 169 to release the first relay, thereby restoring this bistable control means to establish a power circuit to the clutch-control circuit 58 via circuit 174, switch 151, circuit 171, and pole 156. Secondly and simultaneously, the release winding 164 is energized via circuit 153, pole 161 and circuit 166, to release the second relay. All parts are now restored to the initial condition.

Should it be desired to print the accumulated data prior to the end of the test record, the function switch 154 is moved to its third or "Print" position. This energizes the circuit *h* to cause the above-described sequence of operations, including resumption of reading. Immediately after the machine again begins reading it is returned to the "Automatic" position. In moving to this position the switch makes momentary contact with the intermediate, "Start" contact to energize circuits 152 and 153 and thereby release the first and second relays as described in the preceding paragraph. Any subsequent printing for the same test will be recognized as pertaining to the test partially printed on the preceding line by the occurrence of zeros for all fixed data positions other than those set by the manually settable switches. When the function switch makes temporary contact with the "Start" contact, the direct current applied to the circuit 152 is prevented by the diode 165 from energizing the relay solenoid 60, thereby preventing spurious operation of the relay poles 62—67.

I claim as my invention:

1. A system for reading out quantitative data from a record which bears machine-sensitive data marks denoting additive elements of different items of data, said data marks pertaining to each item of data being allotted to a particular allocated longitudinal record channel so that all marks in each allocated channel pertain to the allotted items, said record in addition including an end-of-test mark denoting the end of a series of data marks, said system comprising:

a record-reading machine for said record including means for advancing said record parallel to said channels past a reading station and a plurality of two-position circuit-control devices responsive to data marks in corresponding record channels; said advancing means advancing said record intermittently and said circuit-control devices being actuated during the period said record is at rest;

a separate electrically actuated accumulator for each said circuit-control device;

a separate circuit chanel interconecting each said circuit-control device to a corresponding accumulator for advancing the respective accumulator in accordance with the marks in the record channel and electrical circuit control means on each said accumulator for indicating the accumulated data thereon;

a circuit channel for transmitting signals indicating said accumulated value;

and means responsive to the said presence of said end-of-test mark for sequentially transmitting said data signals from the several accumulators to said circuit channel.

2. In combination with the system according to claim 1, wherein said record includes a machine-sensitive end-of-test mark denoting the end of a series of data marks and start-of-test denoting the beginning of a series of data marks, and wherein said record-reading machine includes a control circuit for starting and stopping the machine, a first two-position control means responsive to the presence of said end-of-test mark at the reading station for changing the energization of said circuit to stop the machine, an auxiliary control means for restoring the energization of said control circuit to re-start the machine, and means responsive to the presence of said start-of-test mark for restoring said first two-position control means to continue said restored energization of the control circuit and disable said auxiliary control means.

3. In combination with the system according to claim 1, an electrically controlled printing machine responsive to the data signals in said circuit channel and coupled thereto, said printing machine having a switch which is operated upon the performance of each printing operation; the said means for sequentially transmitting the data signals comprising a stepping switch for completing the circuit channel successively through said accumulators; and a feed-back circuit from said printer-operated switch to the stepping switch for advancing the latter following each printing operation.

4. In combination with the system according to claim 3, means responsive to the position of said stepping switch for re-starting the operation of said record-reading machine after said circuit channel has been completed in succession through all accumulators.

5. In combination with the system according to claim 4, means responsive to the position of said stepping switch for resetting all accumulators after said circuit channel has been completed in succession through all accumulators.

6. A system for reading out quantitative data from a record which bears machine sensitive data marks denoting additive elements of different items of data, said data marks being allotted to particular allocated longitudinal record channels at least some of said allocated channels containing marks pertaining to two different items of data falling within first and second groups, respectively, so that all marks in each allocated channel pertain to allotted items, said record having a control channel containing machine-sensitive data-identification marks in juxtaposed relation to data marks for denoting data marks of the first group, comprising: a record-reading machine for said record including means for advancing said record parallel to said record channels past a reading station and a plurality of two-position circuit control devices responsive to marks in corresponding record channels; said advancing means advancing said record intermittently and said circuit control devices being actuated during the period said record is at rest; a separate first electrically-actuated accumulator for each said circuit-control device which is associated with a record channel containing marks of the first group of data; a separate second electrically-actuated accumulator for each said circuit-control device which is associated with a record channel containing marks of the second group of data; a separate circuit channel interconnecting each said accumulator to the corresponding circuit-control device for advancing the respective accumulator in acordance with the marks in the record and means in said circuit channels responsive to the circuit-control device associated with the control channel for opening the said channel circuits to the second accumulators and closing the said channel circuits to the first accumulators when a data-identification mark is present, and vice versa when no data-identification mark is present.

References Cited in the file of this patent

UNITED STATES PATENTS

| | | |
|---|---|---|
| 2,413,965 | Goldsmith | Jan. 7, 1947 |
| 2,564,920 | Owens | Aug. 21, 1951 |
| 2,600,817 | Victoreen | June 17, 1952 |
| 2,689,686 | Tholstrup | Sept. 21, 1954 |
| 2,702,315 | Roderick | Feb. 17, 1955 |
| 2,771,596 | Bellamy | Nov. 20, 1956 |
| 2,782,398 | West et al. | Feb. 19, 1957 |